United States Patent [19]

Martell et al.

[11] Patent Number: 4,976,400
[45] Date of Patent: Dec. 11, 1990

[54] PLASTIC TOOLING WITH COMPRESSION ADJUSTMENT

[75] Inventors: William A. Martell, Sterling Heights; Ladislaus Weiss, Clawson; Robert P. VanJaarsveld, Sterling Heights, all of Mich.; Colin R. Brown, Grange, Australia

[73] Assignee: General Motors Corporation, Detroit, Mich.

[21] Appl. No.: 367,000

[22] Filed: Jun. 16, 1989

[51] Int. Cl.⁵ .................... B29C 33/40; B29C 43/02; B30B 9/00
[52] U.S. Cl. .................... 249/134; 249/187.1; 264/227; 425/411; 425/394; 100/214; 100/295
[58] Field of Search ............ 264/219, 225, 226, 227; 425/411, 394; 249/134, 155, 144, 187.1; 100/214, 295

[56] References Cited

U.S. PATENT DOCUMENTS

| | | | |
|---|---|---|---|
| 1,151,548 | 8/1915 | Rumple | 425/273 |
| 3,101,065 | 8/1963 | Kalis | 264/225 |
| 3,278,668 | 10/1966 | Eldred | 264/227 |
| 3,515,366 | 6/1970 | Buehler | 264/225 |
| 4,450,130 | 5/1984 | Doerer | 264/219 |
| 4,601,867 | 7/1986 | Martell et al. | 264/227 |
| 4,824,628 | 4/1989 | Curfman | 425/179 |
| 4,834,929 | 5/1989 | Dehoff | 264/226 |

Primary Examiner—Jay H. Woo
Assistant Examiner—Jeremiah F. Durkin, II
Attorney, Agent, or Firm—R. W. Tung

[57] ABSTRACT

Epoxy tooling which inherently expands and contracts with temperature changes for making parts of metal or plastic has elongated rods extending through guide tubes within the tooling and compression washers or plates on opposite sides thereof. These compression devices for strengthening the tool can be selectively adjusted toward and away from one another using nuts threaded on the rods for varying the compression load on the tooling in accordance with varying tool operating loads, working temperatures and amounts of expansion or contraction. Epoxy tools for molding plastics are heated and expanded to a working temperature and then compressively loaded in selected areas prior to molding operations to prevent tool stress cracking or epoxy tools for metal stamping are compressively loaded and supported in selected areas of high tensile stress and operated at room temperatures for high load metal stamping without fracture.

5 Claims, 2 Drawing Sheets

PLASTIC TOOLING WITH COMPRESSION ADJUSTMENT

This invention relates to tooling made from plastics, and more particularly to epoxy tooling with compression adjustment for supporting and strengthening the tooling in areas that experience high tensile stress when working so that the tooling can be used with optimized performance and service like in a wide range of applications, including high load metal stamping and plastic molding at elevated temperatures. This invention also relates to a new and improved method of making epoxy tooling with compression adjustment.

BACKGROUND OF THE INVENTION

Prior to the present invention, various manufacturing tools of plastic materials such as epoxy with fillers have been made to enable manufacturers to produce metal and plastics components in quantity and quality with economy and efficiency. Prior art U.S. Pat. No. 4,601,867 issued Jul. 22, 1986 to W. Martell and L. Weiss, assigned to the assignee of this invention and hereby incorporated by reference, discloses economical epoxy tooling cast directly from full size clay models for subsequent use in manufacturing high quality sheet metal stampings. By use of such epoxy tooling, expensive metal dies can be eliminated to reduce effort and costs for making such components. This prior art patent also discloses epoxy blow molds and injection molds for producing parts from plastics economically and efficiently.

The present invention is of the general category of that disclosed in U.S. Pat. No. 4,601,867, but further improves the tooling performance and durability by strengthening the internal properties of the epoxy body of the tooling. More particularly, longitudinally and laterally extending threaded rods are provided within the tooling and adjustable plates and washers mounted on the rods external to the tooling are used to encase and support the tooling to improve tool strength in areas of high tensile stress. By tightening nuts on the outer ends of the rods, compressive loads are induced into the tooling to match stress loads resulting from the stamping loads and shapes of the parts being processed. Because of the inherent nature of plastic tooling material to expand or contract with temperature change, the force of the compression plates or washers can be effectively adjusted by this invention to match the running temperature of the tool.

Preferably, epoxy tools of this invention for stamping parts from metal blanks are generally operated at room temperatures and the compression devices are torqued from a tool relaxed state to apply predetermined compression loads in areas of the tooling which will experience high tensile stress during stamping operation to prevent tool fracture and optimize tool life. Also, epoxy plastic molding tools of this invention are preferably operated at temperatures well above room temperature and have their compression devices torqued after tool heating and expansion to prevent cracking to optimize tool life. After use, the external compressive loads are removed from metal stamping and plastic molding epoxy tools so they will return to their normal unstressed state and not experience internal stress from the compression load devices of this invention.

These and other features, objects and advantages of this invention will become more apparent from the following detailed description and drawings, in which:

DETAILED DESCRIPTION OF THE PREFERRED EMBODIMENT

Figure 1:
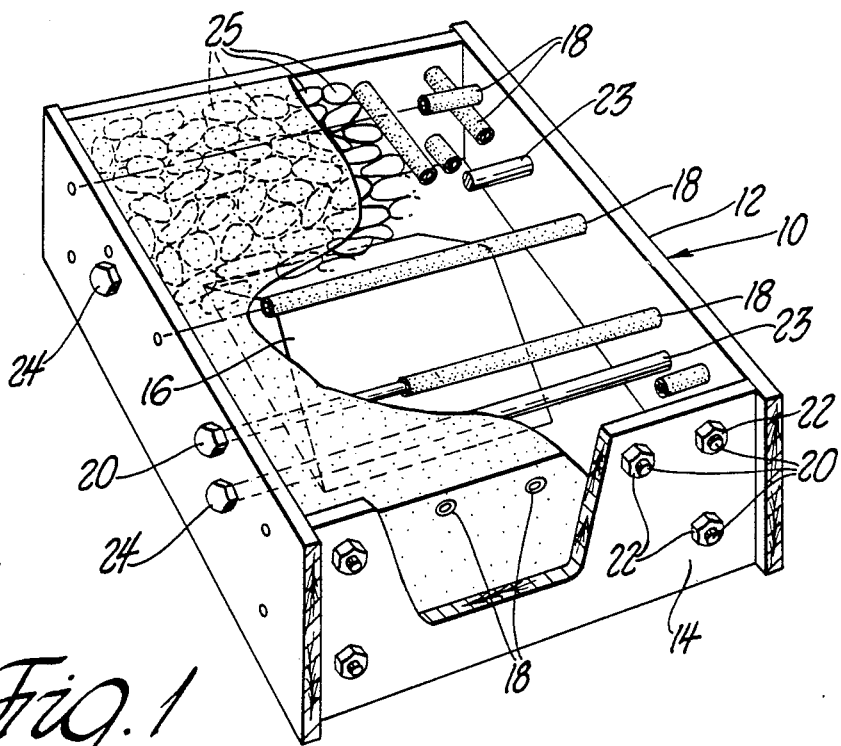
FIG. 1 is a pictorial view partly broken away and with some parts removed or a female tool being made in accordance with this invention.

Referring now in particular detail to FIG. 1, there is shown a rectilinear pattern box 10 formed from wooden side pieces 12 connected at or near their extremities to wooden end pieces 14 and sized to compass a female mold pattern 16 which may be in the shape of a triangular prism seated in the bottom of the box. Laterally and longitudinally extending plastic tubes 18 are mounted in the box 10 at predetermined strategic positions by conventional hex headed bolts 20 and nuts 22 threaded on their ends. Laterally extending steel handling pipes 23 with threaded outer ends are supported in the pattern box by screws 24. These steel pipes are used as attachment devices for securing the tool of this invention to a stamping press.

Initially, about one-third of the box 10 is filled with epoxy resin which has a silicon carbide powder or other abrasive resistant filler suitable for sheet metal stamping tools. Subsequently, a filler of field stone 25 or chunks of thermally conductive material are added to the box which may be supported by a screen (not shown) immediately above the female mold pattern 16 if the rocks have a specific gravity greater than that of the cast epoxy. The screen can be used above the rocks if the specific gravity of the rocks is less than that of the epoxy to prevent their floating to the surface of the epoxy. In any event, the box is subsequently topped off with an added quantity of the filled epoxy and allowed to cure. After curing, screws 24 are removed from handling pipes 23 and nuts 22 are removed from the bolts 20. These bolts are then linearly withdrawn from the box by their headed ends and the cast epoxy tool 26 is unmolded from the pattern box.

The tool is generally rectilinear in shape with opposing side and end walls 28, 30 and has a metal stamping die or recess 31 shaped by the mold pattern 16 formed in the working face thereof. With the bolts 20 removed, the strategically placed longitudinally and laterally extending plastic tubes 18 are left as internal conduits for the selectively torqued longitudinally and laterally extending adjustable compression devices 32. These devices comprise elongated hex headed steel bolts 34, annular compression washers 36 through which the bolts 34 extend and which contact localized areas of the opposite side and end walls of the tool 26 and hex nuts 38 threaded on the ends of bolts 34 outboard of an associated localized force spreading washer to complete the female tool shown in FIG. 2.

For working, the strategically located and adjustable compression devices can be selectively torqued down to a predetermined torque by a conventional torque wrench to compressively load and strengthen the tool to withstand the high stress loads resulting from stamping operations. When at rest, the compressive loads are relieved so that the tool is not stressed by the compression devices themselves.

Figure 2:
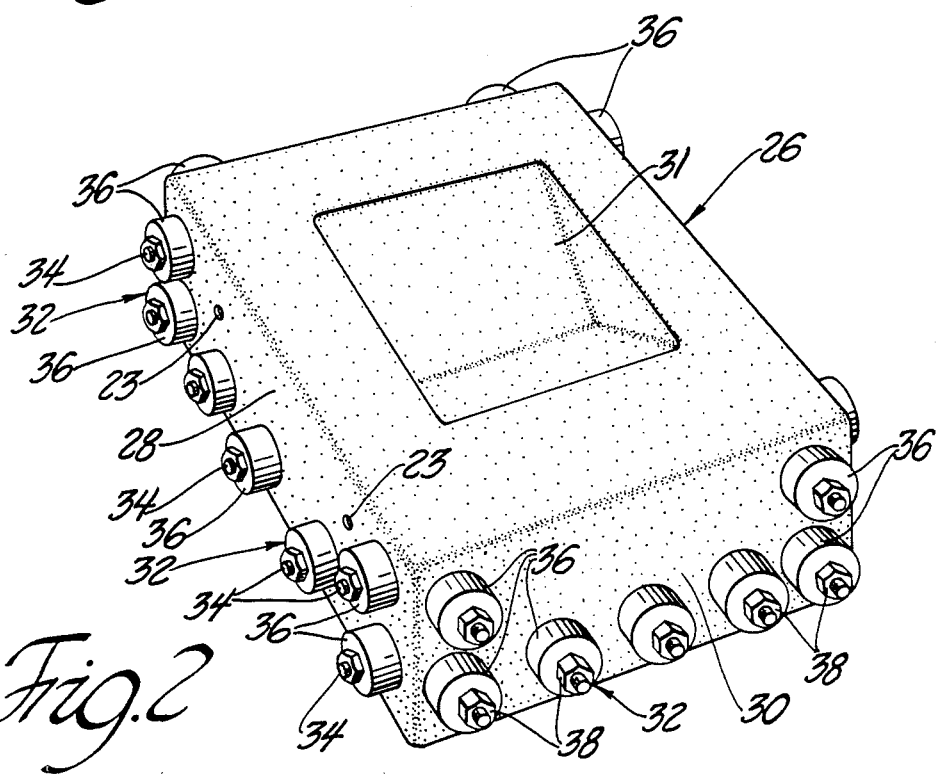
FIG. 2 is a pictorial view female tool produced according to FIG. 1 with compression rods and washers in place for adjustable compressively loading the mold prior to use.
Figure 3:
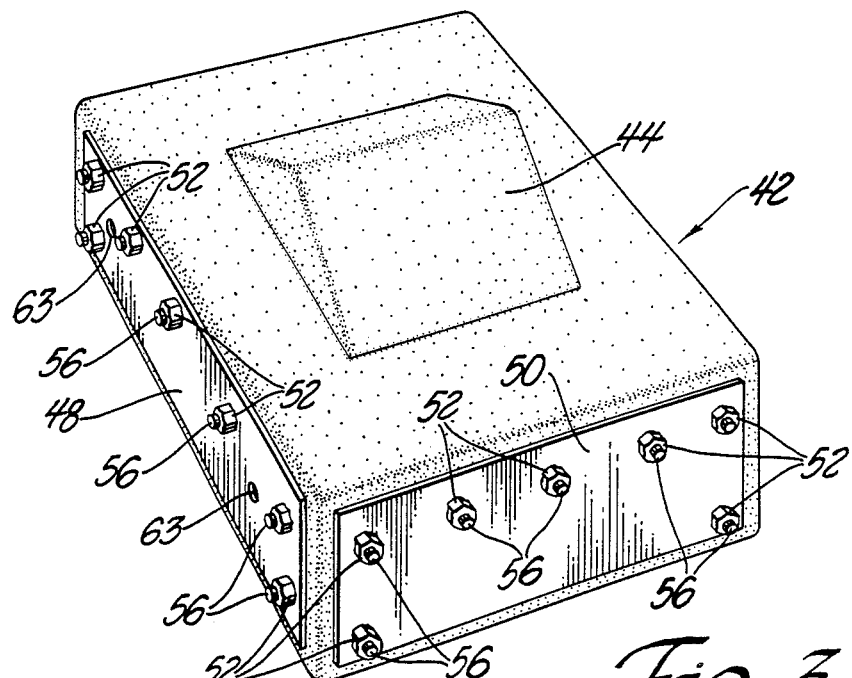
FIG. 3 is a pictorial view of a male mold or tool made according to the present invention, similar to FIG. 2, but illustrates a modification thereof.

FIG. 3 shows a filled epoxy and field stone tool 42 similar to that of FIGS. 1 and 2, but which has a male sheet metal forming punch 44 that is the counterpart to the female metal stamping die 31 of FIG. 2. Additionally, in the tool of FIG. 3, there is illustrated another preferred embodiment of the adjustable compression devices of this invention in the form of pairs of steel metal side and end plates 48 and 50 which have suitable openings 53 therethrough for the hex headed bolts 56 that extend through the longitudinally and laterally extending plastic tubes 58 provided in this male tool. Nuts 59 threaded on the ends of bolts 56 outboard of plates 48 and 50 can be torqued down by conventional tooling for compression loading. The side and end plates 48 and 50 are generally like the compression washers 36 in the FIG. 2 embodiment but cover most of the area of the side and end walls of the tool, and accordingly, spread the compression load across these areas instead of the more localized areas as in the FIG. 2 construction.

Figure 4:
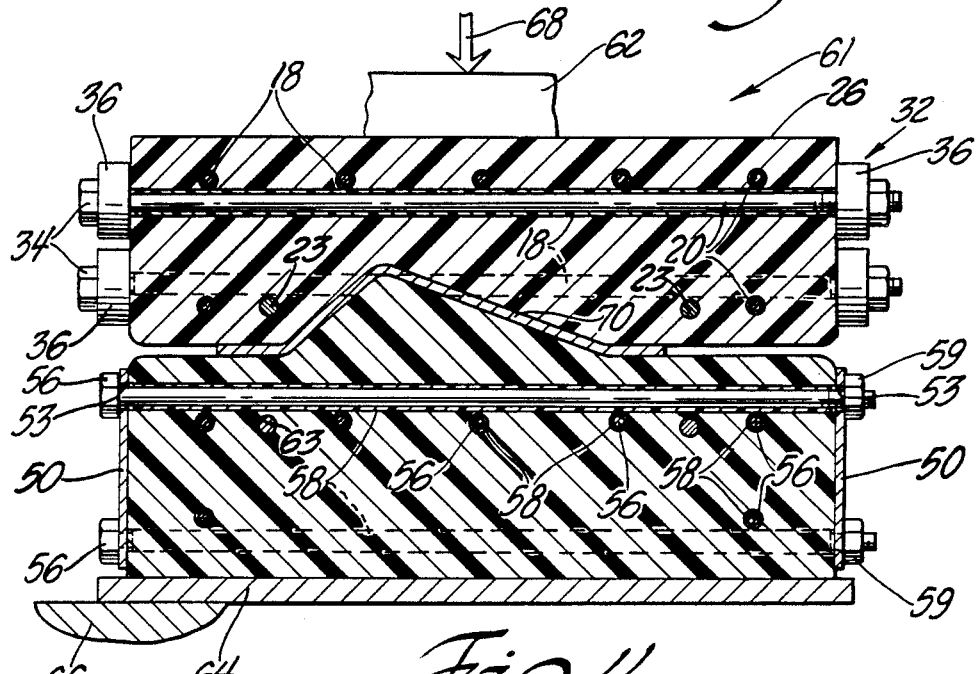
FIG. 4 is a cross-sectional view of the male and female tooling of FIGS. 2 and 3 as a die set illustrating stamping of a sheet metal part.

FIG. 4 diagrammatically illustrates the male and female workpieces of the FIGS. 2 and 3 construction mounted in a metal stamping press 61 for working at room temperature environment. The female tool 26 can be fastened to a binder ring (not shown) of a top platen 62 by mounting bolts which thread into ends of the handling pipes 23 provided within the tool. The male die is similarly fastened to a binder ring by mounting screws threaded into the ends 63 of handling pipes provided in this tool. The binder ring rests on a base 64 on a bottom platen 66. The tools are opened and then closed by the press under high stamping load 68 to form the triangular shaped sheet metal part 70. With the compression devices of FIGS. 2, 3 and 4 supportively encasing and compressively loading the tooling from the sides, the service life and ability of the epoxy tool to withstand high tensile stress loads as well as other forces generated by the stamping press and the shape of the part being formed are optimized.

In addition to the epoxy metal stamping tools described above, epoxy tools for forming plastic articles can be produced in a similar manner. These epoxy tools for molding plastic parts are generally heated and worked at elevated temperatures, and after tool expansion, the compression devices are torqued down by conventional tools to provide support and reinforcement in areas of high expansion stress. After use, the compression loads are relieved from both metal stamping and plastic molding tools so they can be maintained in a naturally unstressed condition until needed for additional runs, at which time they are again torqued so that the needed compression and reinforcement are provided.

The embodiments of the invention in which an exclusive property or privilege is claimed are defined as follows:

1. A tool for use in conditions producing high tensile stress loads therein comprising in combination: a tool body of plastics material having opposing sides, compression means operatively associated with said tool body for contacting each of said opposing sides of said tool body and for supporting and compressively loading said body and load imparting means associated with said compression means for selectively adjusting said compression means towards one another for increasing the compression loads on said body so that said body withstands internal high stress loads when working under high load conditions and for relieving said compression means from said body when said tool is inactive.

2. The tool defined in claim 1, and further including passage means having a plurality of discrete passageways in said body extending between said opposing sides thereof, said compression means being provided by elongated rod means extending through said passage means, force spreader means operatively associated with said elongated rod means and disposed at opposite ends of said rod means adjacent to said opposing sides of said body, and adjustable actuator means operatively mounted on said rod means for compressively loading said body through movement of said force spreader means toward one another.

3. The tool defined in claim 2 wherein said force spreader means are provided by compression washer means operatively mounted on opposite end portions of said rod means engaging only localized areas of said sides, and wherein said actuator means are provided by nut means operatively associated with said washer means and threadedly adjustable on at least one end of each of said rod means.

4. The tool defined in claim 2, wherein said force spreader means are provided by flat plate means engaging a major portion of the sides of said body and on opposite end portions of said rod means and wherein said actuator means are threaded means operatively mounted on at least one end of each of said rod means for moving said plate means toward one another.

5. A plastic tool capable of withstanding high tensile stress working loads, comprising in combination: a body of hardened epoxy having a working face and two opposing sides on either side of said face, through passage means extending from one of said sides to the other, compression load means for inducing compression loads to said body, said compression load means including rod means extending through each of said passage means, load spreading means disposed on said rod means contacting said opposite sides of said body, and linear force inducing means associated with said rod means for axially loading said load spreading means for compressively loading said body so that said body accommodates high tensile loads for optimized working performance.

* * * * *